United States Patent
Kass

(10) Patent No.: US 8,244,029 B1
(45) Date of Patent: *Aug. 14, 2012

(54) RECURSIVE FILTERS ON GPUS

(75) Inventor: Michael Kass, Berkeley, CA (US)

(73) Assignee: Pixar, Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,734

(22) Filed: Jan. 10, 2011

Related U.S. Application Data

(60) Continuation of application No. 12/861,271, filed on Aug. 23, 2010, now Pat. No. 7,885,454, which is a division of application No. 11/698,484, filed on Jan. 25, 2007, now Pat. No. 7,787,688.

(60) Provisional application No. 60/762,237, filed on Jan. 25, 2006.

(51) Int. Cl.
G06K 9/00 (2006.01)
G06K 9/44 (2006.01)
G06K 9/40 (2006.01)
H04N 5/217 (2006.01)

(52) U.S. Cl. ........ 382/154; 382/100; 382/265; 382/275; 348/241

(58) Field of Classification Search .................. 382/154, 382/111, 162, 275, 261, 276, 260, 263, 274, 382/264, 265, 100; 348/761, 739, 744, 759, 348/760, 241; 430/204, 218, 487, 244, 494; 359/252, 237, 238, 240, 245, 246; 703/5, 703/6

See application file for complete search history.

(56) References Cited

U.S. PATENT DOCUMENTS

| | | | |
|---|---|---|---|
| 5,148,379 A | 9/1992 | Konno et al. | |
| 5,267,030 A | 11/1993 | Giorgianni et al. | |
| 5,345,517 A | 9/1994 | Katayama et al. | |
| 5,446,870 A | 8/1995 | Hinsberg, III et al. | |
| 5,448,654 A | 9/1995 | Katayama et al. | |
| 5,571,656 A | 11/1996 | Kingsley et al. | |
| 5,579,455 A | 11/1996 | Greene et al. | |
| 6,300,960 B1 | 10/2001 | DeRose et al. | |
| 6,563,511 B1 | 5/2003 | Yeh et al. | |
| 6,731,821 B1 | 5/2004 | Maurer et al. | |
| 6,970,171 B2 | 11/2005 | Baraff et al. | |
| 7,006,704 B2 | 2/2006 | Kobayashi et al. | |
| 7,187,810 B2 | 3/2007 | Clune et al. | |
| 7,247,383 B1 | 7/2007 | Kass et al. | |
| 7,885,454 B1 * | 2/2011 | Kass ........................... | 382/154 |

OTHER PUBLICATIONS

Baraff et al., "Physically based modeling." *Online SIGGRAPH 2001 Course Notes*. <www.pixar.com/companyinfo/research/pbm2001>.
Blelloch, "Prefix sums and their applications." *Tech. Rep. CMU-CS-90-190*, Carnegie Mellon University, School of Computer Science, Nov. 1990.

(Continued)

*Primary Examiner* — Sheela Chawan
(74) *Attorney, Agent, or Firm* — Kilpatrick Townsend & Stockton LLP

(57) ABSTRACT

A computer-implemented method for generating depth-of-field effects includes receiving information specifying an input image rendered using a pinhole camera. A first set of circles of confusion associated with portions of the input image are determined based a set of parameters associated with the pinhole camera. The first set of circles of confusion are then associated with heat conductivity of a medium. The portions of the input image are blurred according to heat diffusion in the medium to generate a first output image having a first depth-of-field effect.

23 Claims, 8 Drawing Sheets

OTHER PUBLICATIONS

Bolz et al., "Sparse matrix solvers on the GPU: Conjugate gradients and multigrid." *ACM Transactions on Graphics*, 22(3): 917-924, 2003.

Buhler et al., "A phenomenological model for bokeh rendering." in *ACM SIGGRAPH 2002 Conference Abstracts and Applications*. http://www/flarg.com/Graphics/Bokeh.html. 2002.

Burt et al., "A multiresolution spline with application to image mosaics." *ACM Transactions on Graphics* 2(4): 217-236, Oct. 1983.

Cook et al., "Distributed ray tracing." In *Computer Graphics (Proceedings of SIGGRAPH 84)* vol. 18, No. 3, pp. 137-145. 1984.

Galoppo et al., "LU-GPU: Efficient algorithms for solving dense linear systems on graphic hardware." In *Proceedings of the 2005 AMC/IEEE Conference on Supercomputing*, 3. 2005.

Goodnight et al., "A multigrid solver for boundary value problems using programmable graphics hardware." In *Graphics Hardware 2003*, pp. 102-111, 2003.

Haeberli et al., "The accumulation buffer: hardware support for high-quality rendering." In *Computer Graphics (Proceedings of SIGGRAPH 90)*, vol. 24, pp. 309-318, 1990.

Harris, "Mapping computational concepts to CPUs." In *GPU Gems 2*, M. Pharr, Ed. Chapter 31, Addison Wesley, pp. 493-508, Mar. 2005.

Hillesland et al., "Nonlinear optimization framework for image-based modeling on programmable graphics hardware." *ACM Transactions on Graphics 22*, 3, pp. 925-934, Jul. 2003.

Hockney, "A fast direct solution of Poisson's equation using Fourier analysis." *Journal of the ACM*, vol. 12, No. 1, pp. 95-113, Jan. 1965.

Horn, "Stream reduction operations for GPGPU applications." In *GPU Gems 2*, M. Pharr, Ed. Chapter 36, Addision Wesley, pp. 573-589, Mar. 2005.

Karniadakis et al., "Parallel scientific computing in C++ and MPI: a seamless approach to parallel algotithms and their implementation." Cambridge University Press, Ch. 9, pp. 455-537, Jun. 16, 2003.

Kass et al., "Interactive depth of field using simulated diffusion on a GPU.", Jan. 18, 2007.

Kass et al., "Rapid, stable fluid dynamics for computer graphics." *Computer Graphics (Proceedings of SIGGRAPH 90)*, vol. 24, No. 4, pp. 49-57, 1990.

Křivánek et al., "Fast depth of field rendering with surface splatting." *Computer Graphics International*, pp. 196-201, 2003.

Krüger et al., "Linear algebra operators for GPU implementation of numerical algorithms." *ACM Transactions of Graphics 22*, 3, pp. 908-916, Jul. 2003.

Potmesil et al., "A lens and aperture camera model for synthetic image generation." *Computer Graphics (Proceedings of SIGGRAPH 81)*, vol. 15, pp. 297-305, 1981.

Riguer et al., "Realtime depth of field simulation." *Shader $X^2$: Shader programming Tips and Tricks with DirectX 9*. W.F. Engel, Ed. Wordware, Chapter 4, pp. 363-377, 2004.

Scheuermann et al., "Improved depth-of-field rendering." *ShaderX$^3$: Advanced Rendering with DirectX and OpenGL*, W. Engel, Ed. Charles River Media, Chapter 4, Section 4, pp. 363-377, Nov. 2004.

Williams, "Pyramidal parametrics." *Computer Graphics (Proceedings of SIGGRAPH 83)*, vol. 17, No. 3, pp. 1-11, 1983.

Yu, "Depth of field implementation with OpenGL." *Journal of Computing Sciences in Colleges*, 20(1): 136-146, Oct. 2004.

* cited by examiner

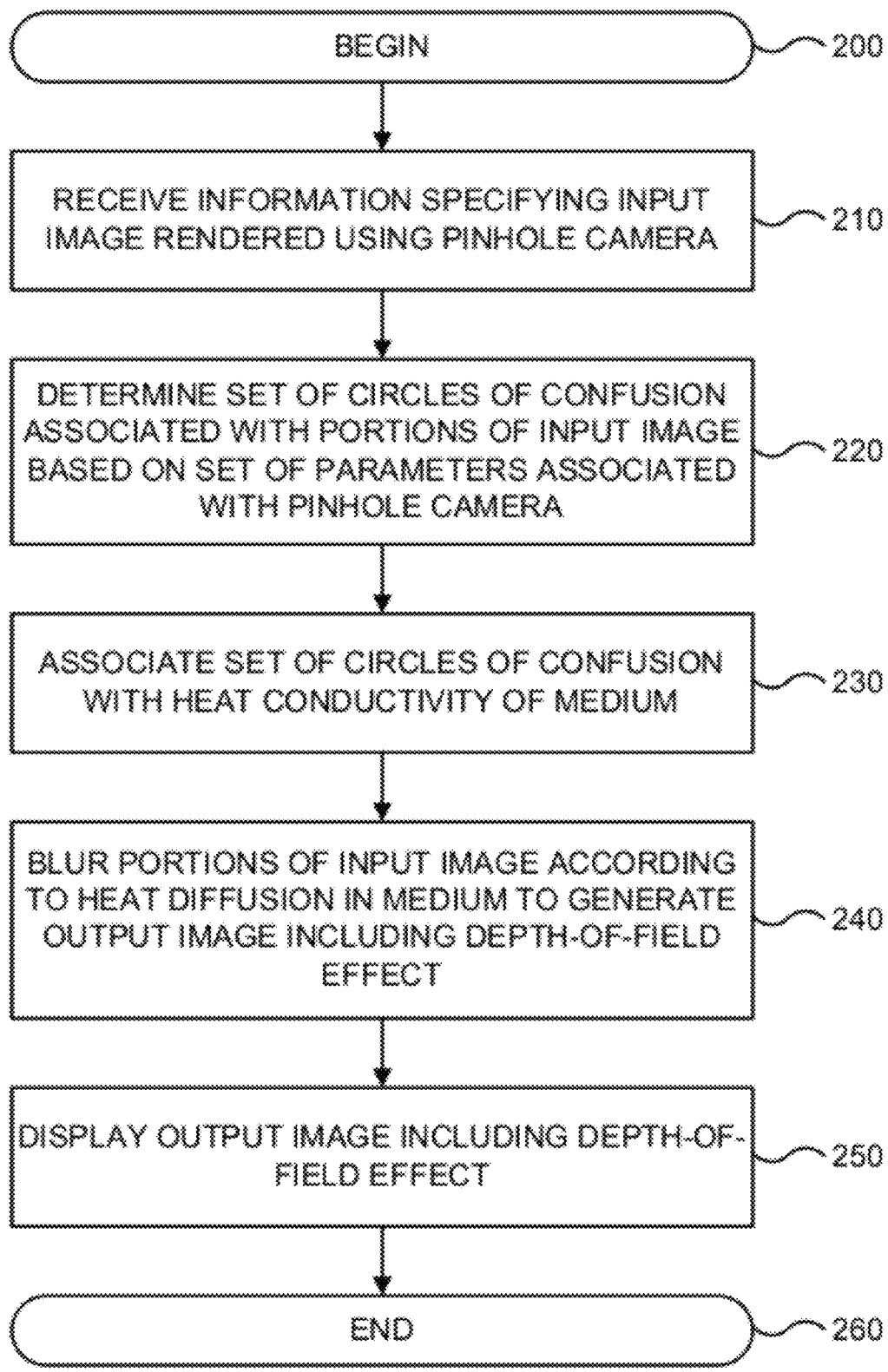

RECURSIVE FILTERS ON GPUS

CROSS-REFERENCES TO RELATED APPLICATIONS

This Application is a Continuation of U.S. patent application Ser. No. 12/861,271, filed Aug. 23, 2010, now U.S. Pat. No. 7,885,454 B1 and entitled "Recursive Filters on CPUs," which is a Divisional of U.S. patent application Ser. No. 11/698,484, filed Jan. 25, 2007, now U.S. Pat. No. 7,787,688 B1 and entitled "Interactive Depth of Field Using Simulated Heat Diffusion," which claims the benefit of and priority to U.S. Provisional Application No. 60/762,237, filed Jan. 25, 2006 and entitled "Interactive Depth of Field Using Simulated Diffusion On a GPU," the disclosures of which are hereby incorporated by reference for all purposes.

BACKGROUND OF THE INVENTION

The present invention relates to computer graphics. More specifically, the present invention relates to methods and apparatus for creating interactive depth of field effects using simulated heat diffusion.

Depth-of-field (DOF) effects are essential in producing computer graphics imagery that achieves the look and feel of film. Unfortunately, the computations needed to compute these effects have traditionally been very slow and unwieldy. As a consequence, the effects are both costly to create and difficult to direct. Accordingly, accurate computation of depth-of-field effects in computer graphics rendering is generally very time consuming, creating a problematic workflow for film authoring. The computation is particularly challenging because it depends on large-scale spatially-varying filtering that must accurately respect complex boundaries.

Typically, in order to generate a high-accuracy result, a DOF computation must combine information about rays that pass through different parts of a lens. A variety of real-time DOF solutions have been proposed for games, but the compromises in quality required to achieve the necessary frame rates have made these attempts unsuitable for film. Additionally, some approaches to computing DOF vary in the detail with which they model the lens and light transport, their performance-quality tradeoffs, and in their suitability to implementation on graphics hardware.

In one example, an accumulation buffer method takes the approach of simulating DOF effects by blending together the results of multiple renderings, each taken from slightly different viewpoints. Unfortunately, the accumulation buffer method requires a large collection of renderings to achieve a pleasing result, and the enormous geometric complexity of film-quality scenes makes this prohibitive. It is not unusual for the geometry of film-quality scenes to exceed any available RAM, so doing multiple passes through the original geometry is out of the question for interactive film preview.

In order to achieve interactive performance, most film authoring rely largely on two post-processing approaches which can be divided into two major categories: scattering and gathering. Scatter techniques (also known as forward-mapping techniques) iterate through the source color image, computing circle of confusions for each source pixel and splatting its contributions to each destination pixel. Proper compositing requires a sort from back to front, and the blending must be done with high-precision to avoid artifacts. Distributing energy properly in the face of occlusions is also a difficult task. Though scatter techniques are commonly used in non-real-time post-processing packages, they are not the techniques of choice for today's real-time applications, primarily because of the cost of the sort, the lack of high-precision blending on graphics hardware, and the difficulty of conserving total image energy.

Gather techniques (also known as reverse-mapping techniques) do the opposite: they iterate through the destination image, computing the circle of confusion for each destination pixel and with it, gathering information from each source pixel to form the final image. The gather operation is better suited for graphics hardware than scatter. Indeed, the most popular real-time DOF approaches today use this technique. Nonetheless, the gather operation is still not very well matched to today's Single Instruction, Multiple Data (SIMD) graphics hardware, because of the non-uniformity of the sizes of circles of confusion. The gathering method also has difficulty with edge discontinuities and edge bleed.

Moreover, even if efficiently implemented on target hardware, standard gather and scatter techniques have poor asymptotic complexity because the amount of work they do is the product of the number of pixels in the image and the average area of the circle of confusion. For example, For an n×n image, standard gather and scatter algorithms are $O(n^4)$, which is clearly problematic for high-resolution film-quality images. In order to bring the computational cost down to a level that permits real-time performance, some implementations compute large blur kernels by down-sampling. While down-sampling may provide a sensible compromise to achieve adequate performance for games on typical hardware, down-sampling causes artifacts that are unacceptable for film authoring, especially film preview. Another problem with down-sampling is that existing techniques do not allow large-scale blurs to be computed efficiently in ways that respect the critical boundaries between in-focus objects and those that are out-of-focus. As a result, the acceleration methods used to down-sample will cause unacceptable color bleeding.

Accordingly, what is desired are improved methods and apparatus for solving the problems discussed above, while reducing the drawbacks discussed above.

BRIEF SUMMARY OF THE INVENTION

The present invention relates to computer graphics. More specifically, the present invention relates to methods and apparatus for creating interactive depth of field effects using simulated heat diffusion.

In various embodiments, a computer-implemented method for generating depth-of-field effects includes receiving information specifying an input image rendered using a pinhole camera. A first set of circles of confusion associated with portions of the input image are determined based a set of parameters associated with the pinhole camera. The first set of circles of confusion are then associated with heat conductivity of a medium. The portions of the input image are blurred according to heat diffusion in the medium to generate a first output image having a first depth-of-field effect.

In some embodiments, the portions of the image may be blurred according to heat diffusion in the medium that includes determining, along a first direction of the input image, the diffusion of heat in the medium using a first Gaussian convolution. The distribution of heat in the medium is then determined, along a second direction of the input image, in response to the diffusion of heat along the first direction using a second Gaussian convolution.

In further embodiment, input is received specifying information for at least on parameter in the set of parameters associated with the pinhole camera. A second set of circles of confusion associated with portions of the input image is determined based on the information for the at least one parameter. The second set of circles of confusion are then associated with the heat conductivity of the medium. The portions of the input image are blurred according to heat diffusion in the medium to generating a second output image including a second depth-of-field effect.

In various embodiments, information is received specifying a plurality of ranges of depth for the input image. The information specifying the plurality of ranges of depth may include information specifying a midground layer and a background layer. In some embodiments, portions of the input image associated with the midground layer may be matted to generate a background image. A second set of circles of confusion associated with portions of the background image may be determined based on the first set of circles of confusion. The second set of circles of confusion then may be associated with the heat conductivity of the medium. The portions of the background image may be blurred according to heat diffusion in the medium. The blurred background image may then be blended with the first output image to generate a second output image.

In some embodiments, information is received specifying a foreground layer. Information may be received specifying a foreground image representing an object in the foreground layer of the input image. A third set of circles of confusion associated with portion of the foreground image is determined. The third set of circles of confusion then may be associated with heat conductivity of the medium. The portions of the foreground image may be blurred according to heat diffusion in the medium. The blurred foreground image may be merged with the second output image to generate a third output image.

In some embodiments, the portion of the input image may be blurred according to heat diffusion in the medium using a GPU of a computer system. The output image may be displayed including the first depth-of-field effect.

In various embodiments, a system for generating depth-of-field effects includes a CPU and a GPU. The CPU receives information specifying a first image rendered using a pinhole camera, determines a first set of circles of confusion for portions of the first image based on one or more parameters associated with the pinhole camera, and associates the first set of circles of confusion with heat conductivity of a medium. The GPU generates a second image including a first depth-of-field effect based on the portions of the first image and heat diffusion in the medium. The system may display the second image on a display device.

In some embodiments, the CPU executes a plurality of instructions related to a computer animation program. The GPU may generate the second image in response to the plurality of instructions related to the computer animation program. In still further embodiments, the CPU executes a plurality of instructions related to an interactive game. The GPU generates the second image in response to the plurality of instruction related to the interactive game.

In various embodiments, computer program product is stored on a computer readable medium configured to store instructions executable by a processor of a computer system for generating depth-of-field effects. The computer program product includes code for receiving information specifying an input image rendered using a pinhole camera. The computer program product includes code for determining a first set of circles of confusion associated with portions of the input image based a set of parameters associated with the pinhole camera. The computer program product includes code for associating the first set of circles of confusion with heat conductivity of a medium. The computer program product includes code for blurring the portions of the input image according to heat diffusion in the medium to generate a first output image having a first depth-of-field effect.

A further understanding of the nature and the advantages of the inventions disclosed herein may be realized by reference of the remaining portions of the specification and the attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 2 is a simplified flowchart for providing interactive depth-of-field effects using simulated heat diffusion in one embodiment according to the present invention.

DETAILED DESCRIPTION OF THE INVENTION

The present invention relates to computer graphics. More specifically, the present invention relates to methods and apparatus for creating interactive depth of field effects using simulated heat diffusion.

In various embodiments, methods and apparatus for generating depth-of-field (DOF) effects according to the present invention generate depth-of-field effects by simulating heat diffusion in a medium (e.g., a non-uniform or uniform medium) are provided. In general, simulating heat diffusion in the medium gives rise to separable spatially varying recursive filters that can compute large-kernel convolutions in constant time per pixel while respecting the boundaries between in-focus and out-of-focus objects.

In some embodiments, methods and apparatus for generating depth-of-field (DOF) effects according to the present invention use a graphics processing unit (GPU). Depth-offield effects may be vectorized and achieve interactive frame rates suitable for games and high-quality animation systems. In various embodiments, methods and apparatus according to the present invention generate depth-of-field effects that can create high-quality film previews that can be computed at interactive rates using GPUs. Such image quality and frame rates should be sufficient to allow a director of photography to specify, edit, and approve aperture settings and focus pulls interactively, offering a far greater level of artistic control. Moreover, such image quality and frame rates may also allow development by game developers desiring a good-quality interactive result.

In some embodiments, methods and apparatus for generating depth-of-field effects using simulated heat diffusion use a central processing unit (CPU) and a graphics processing unit (GPU). Using the CPU, information is received specifying an image rendered using a pinhole camera. Using the CPU, a set of circles of confusion may be determined for portions of the image based on parameters associated with the pinhole camera. Using the CPU, the circles of confusion are associated with heat conductivity of a medium. Using the GPU, depth-of-field effects are generated for the image according to heat diffusion in the medium. The image may be displayed, including the depth-of-field effect using a display device.

Figure 1:
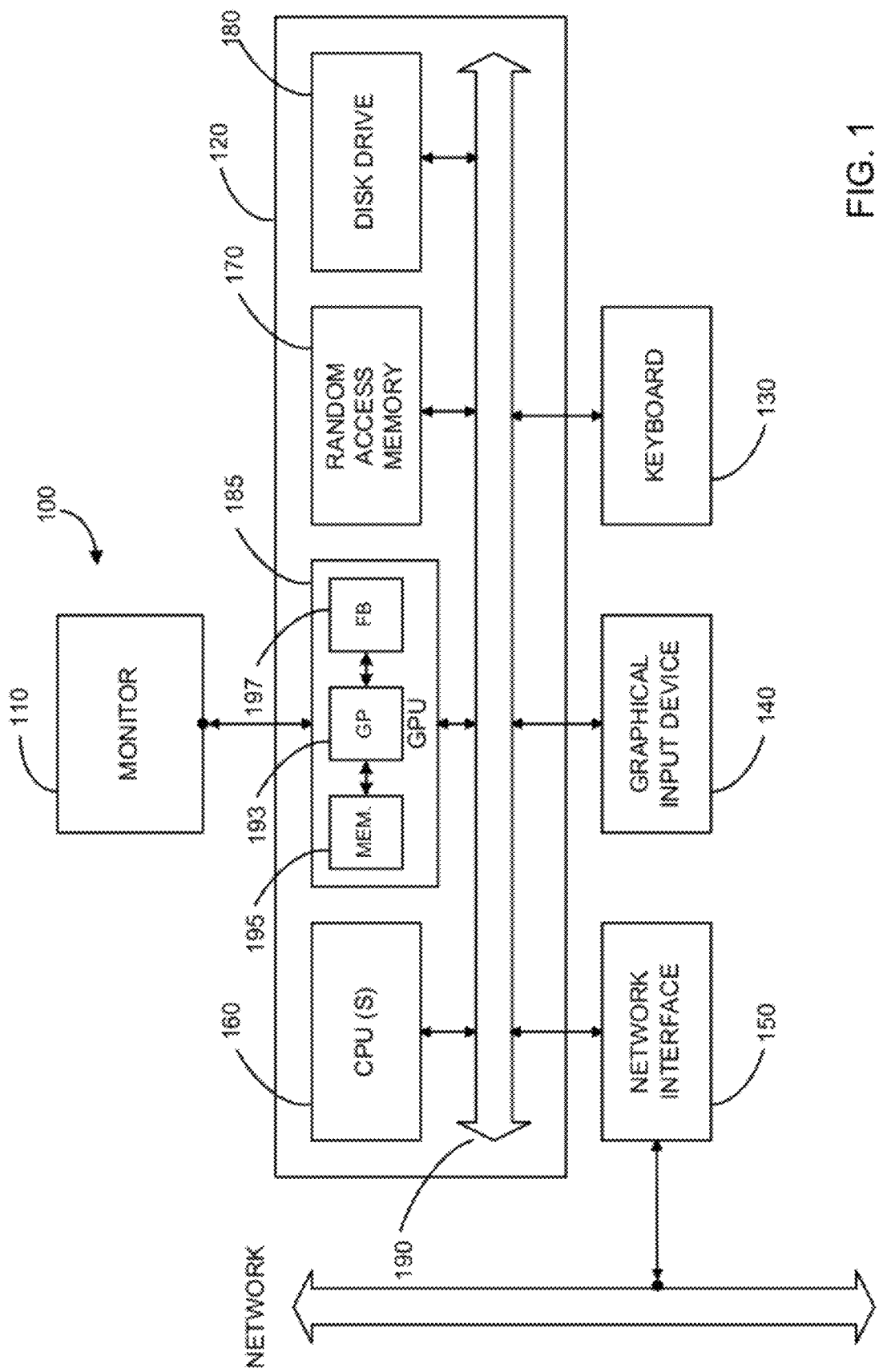
FIG. 1 is a block diagram of a typical computer system that may practice embodiments of the present invention.

FIG. 1 is a block diagram of typical computer system 100 according to an embodiment of the present invention.

In one embodiment, computer system 100 includes a monitor 110, computer 120, a keyboard 130, a user input device 140, computer interfaces 150, and the like.

In various embodiments, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, and may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In some embodiments, computer 120 includes one or more Xeon microprocessors from Intel. Further, in one embodiment, computer 120 includes a UNIX-based operating system.

RAM 170 and disk drive 180 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors. In this example, GPU 185 includes a graphics processor 193, a number of memories and/or registers 195, and a number of frame buffers 197.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Simulating Heat Diffusion

In general, computer system 100 may be configured to generate depth-of-field effects for a source or input image by determining or computing the blurring of the input image by simulating heat diffusion in a medium. In one example, computer system 100 uses a heat equation for simulating heat diffusion in a non-uniform medium. The input image color intensities from a pinhole camera view provide a heat distribution for the heat diffusion equation that diffuses outward to produce a depth-of-field effect in the input image to create or generate an output image. In some embodiments, where the circles of confusion are large, computer system 100 models the heat or thermal conductivity of the medium as high, so the diffusion will extend outward, for example, to an appropriate radius. Where the circle of confusion reaches zero, the thermal conductivity will correspondingly be zero, creating a perfect insulator that completely decouples the color of a sharp object from the color of an adjacent blurry object.

FIG. 2 is a simplified flowchart for providing interactive depth-of-field effects using simulated heat diffusion in one embodiment according to the present invention. The processing depicted in FIG. 2 may be performed by software modules (e.g., instructions or code) executed by CPU(s) 160 and/or GPU 185 of computer system 100, by hardware modules of computer system 100, or combinations thereof. FIG. 2 begins in step 200.

In step 210, computer system 100 receives information specifying an input image generate or rendered using a pinhole camera. Accordingly, each point of the input image is rendered in focus. In some embodiments, the input image includes a plurality of pixels specified by integer color values (RGB values) and a depth floating point value (Z value). The input image may also include other information, such as transparency and the like.

In step 220, system 100 determines a set of circles of confusion associated with portions of the input image based on a set of parameters associated with the pinhole camera. In general, a circle of confusion is an optical spot caused by a cone of light rays from a camera lens that does not come to a perfect focus when imaging a point source. To calculate a camera's depth of field, computer system 100 determines how large a circle of confusion can be considered to be an acceptable focus from the pinhole camera parameters. In general, the maximum acceptable diameter of such a circle of confusion is known as the maximum permissible circle of confusion, the circle of confusion diameter limit, or the circle of confusion criterion, but is often called simply the circle of confusion.

In this example, computer system 100 determines circles of confusion using parameters associated with the pinhole camera used to render the input image. Some examples of camera parameters are lens focal length, aperture, camera-to-subject distance, distance from the camera to the near limit of depth-of-field, distance from the camera to the far limit of depth-of-field, and the like.

In some embodiments, computer system 100 determines circles of confusion for each pixel of the input image. In various embodiments, computer system 100 determines a circle of confusion for a portion of the input image, such as a plurality of pixels.

In step 230, computer system 100 associates the set of circles of confusion with heat conductivity of a medium. In general, the circles of confusion are converted into heat or thermal conductivity associated with a medium. Properties, such as diameter, radius, circumference, and the like, may be used to create a model of heat conductivity in a medium. In one example, a circle of confusion provides a filter of varying heat conductivity in the medium based on the radius of the circle.

In step 240, computer system 100 blurs the portions of the input image according to heat diffusion in the medium to generate an output image including a depth-of-field effect. In general, computer system 100 receives input image (e.g., an RGBZ image), and generates or renders the output image by using the initial RGB color values of the input image as temperature samples that are distributed using a simulation or representation of heat diffusion in the medium. The circles of confusion provide the heat or thermal conductivity in the medium, allowing the initial RGB color values o the input image to diffuse to create the depth-of-field effect.

In step 250, computer system 100 displays the output image including the depth-of-field effect on monitor 110. FIG. 2 ends in step 260.

In various embodiments, computer system 100 determines the heat or thermal conductivity of a non-uniform medium according to a heat equation (Equation 1), as follows, to simulate or provide a representation of heat diffusion in a medium, represented by the input image x(u,v):

$$\gamma(u, v)\frac{\partial y}{\partial t} = \Delta \leftarrow (\beta(u, v)\nabla y) \tag{1}$$

In this example, $\beta(u,v)$ is the heat conductivity of the medium, $\gamma(u,v)$ is the specific heat of the medium and $\nabla$ represents the del operator in terms of the spatial coordinates u and v. Computer system 100 uses the input image x(u,v) to provide the initial heat distribution for the diffusion. For example, the color value of each pixel in the input image x(u,v) is used as the initial heat value of a temperature sample. Computer system 100 then integrates the heat equation through time to generate the output image y(u,v).

In various embodiments, computer system 100 employs one or more numerical methods to solve the heat equation. In one example, let y(0)=x. Then, the derivative $\partial y/\partial t$ is evaluated at time zero. Computer system 100 then determines where $y(\Delta t)=y(0)+\Delta t(\partial y/\partial t)$.

In some embodiments, an alternating direction implicit (ADI) method is used, which gives rise to very efficient separable Infinite Impulse Response (IIR) or recursive filters. In general, the ADI method is split into two sub-steps. In the first substep, heat diffusion is determined or simulated along the u axis of input image x(u,v). During the second substep, the heat distribution is determine or simulated to further diffuse along the v axis. Typically with the diffusion equation, any objectionable anisotropies in the result generally turn out to be particularly small.

Generally, solutions of the heat diffusion equation in a uniform medium after a fixed time are given by the convolution of the initial conditions with a 2D Gaussian. A 2D Gaussian convolution can then be computed exactly by a horizontal 1D Gaussian convolution followed by a vertical 1D Gaussian convolution.

Continuing the example above, in each substep of the ADI method, computer system 100 solves a 1D diffusion equation (Equation 2) given by:

$$\gamma\frac{\partial y}{\partial t} = \frac{\partial}{\partial u}\beta(u)\frac{\partial}{\partial u} \tag{2}$$

In this example, computer system 100 uses an implicit scheme (Equation 3), also known as backwards Euler, to compute each substep:

$$\frac{y(t + \Delta t) - y(t)}{\Delta t} = \frac{\partial y}{\partial t}\bigg|_{t+\Delta t} \tag{3}$$

In contrast to forward or explicit Euler functions, computer system 100 evaluates the time derivative $\partial y/\partial t$ at the end of the substep, rather than the beginning. Accordingly, computer system 100 generates the result as a set of simultaneous linear equations for the solution which allows the heat diffusion to propagate arbitrarily far in a single step.

In various embodiments, a user or operator of computer system 100 may choose any units for time and space. In one example, computer system 100 uses units in which $\Delta t=1$ and the separation between pixels is unit distance. With these units, discretizing over space by computer system 100 (Equation 4) with finite differences yields:

$$\gamma_i\frac{\partial y}{\partial t} \approx \beta_i(y_{i+1} - y_i) - \beta_{i-1}(y_i - y_{i-1}) \tag{4}$$

Continuing the example, computer system 100 begins with the initial conditions $y_i=x_i$. If a single time step is taken (Equation 5) using the implicit Euler method of Equation (3), then:

$$\gamma_i(y_i-x_i)=\beta_i(y_{i+1}-y_i)-\beta_{i-1}(y_i-y_{i-1}) \tag{5}$$

where $\beta_0=\beta_n=0$, so that the boundary of the input image x(u,v) is surrounded by insulators.

The relationship between $\beta$ and the size of a circle of confusion is determined by computer system 100. For example, where $\gamma$ is unit and $\beta$ is uniform. Then, Equation (5) becomes:

$$y_i-x_i=\beta(y_{i+1}-2y+y_{i-1}) \tag{6}$$

In this example, the right-hand-side of Equation (6) is the product of β and a finite difference approximation to the second derivative of y. Taking a Fourier transform of both sides by computer system 100 and noting that taking n derivatives in space is the same as multiplying by $(i\omega)^n$ in frequency, results in Equation (7):

$$\tilde{y} - \tilde{x} = \beta(i\omega)^2 \tilde{y} \qquad (7)$$

which yields the frequency response of a Butterworth low-pass filter (Equation 8):

$$\tilde{y} = \frac{1}{1 + \beta \omega^2} \tilde{x} \qquad (8)$$

In various embodiments, Butterworth filters are described in terms of a cutoff frequency $\omega_c$ which provides (Equation 9) in terms of $\beta = 1/\omega_c^2$:

$$\tilde{y} = \frac{1}{1 + (\omega/\omega_c)^2} \tilde{x} \qquad (9)$$

In this example, the spatial width corresponding to the diameter of the filter is $1/\omega_c^2$, so we have $\beta = d^2$ where d is the diameter of the circle of confusion. From the circle of confusion, computer system 100 determines β, and computes the results of Equation (5).

In various embodiments, computer system 100 determines the results of Equation (5) which describes a symmetric tridiagonal linear system, in one example, of the form (Equation 10):

$$\begin{pmatrix} b_1 & c_1 & & & 0 \\ a_2 & b_2 & c_2 & & \\ & a_3 & b_3 & c_3 & \\ & & \ddots & \ddots & \ddots \\ 0 & & & a_n & b_n \end{pmatrix} \begin{pmatrix} y_1 \\ y_2 \\ y_3 \\ \vdots \\ y_n \end{pmatrix} = \begin{pmatrix} x_1 \\ x_2 \\ x_3 \\ \vdots \\ x_n \end{pmatrix} \qquad (10)$$

where $c_i = a_i + 1$. The tridiagonal structure of the equations result from the fact that each sample in the 1D heat equation is coupled only to the next and previous sample.

Unlike general linear systems, tridiagonal linear systems generally can be solved very efficiently in constant time per sample. In some embodiments, computer system 100 uses a traditional method for doing this, by factoring the matrix into the product of a lower-diagonal matrix and an upper-diagonal matrix, such as a process known as LU decomposition. By having computed the factors L and U, computer system 100 determines a linear system LUy=x. Next, computer system 100 determines z=Uy from L and x. In some embodiments, computer system 100 uses a process known to applied mathematicians as "forward substitution" and known to people in the signal processing world as the application of a recursive filter.

Then, having determined z, computer system 100 determines y from the equation Lz=x. In various embodiments, computer system 100 uses a process known to applied mathematicians as "back substitution," and to people in the signal-processing world as the application of a backwards recursive filter.

In general, from a signal-processing point of view, the unusual thing about the filters being run forward and backwards to solve the linear system is that their coefficients change over space, properly taking into account the boundary conditions. Because they are IIR filters, the amount of work they do is independent of the size of the filter kernel. In various embodiments, computer system 100 uses LU decomposition to solve tridiagonal systems using CPU(s) 160.

In some embodiments, computer system 100 uses an equivalent process called "cyclic reduction" using GPU 185. In general, computer system 100 determines horizontal diffusion by forming and solving the tridiagonal system of Equation (5), assuming that the specific heat γ is uniformly equal to one. The value of $\beta_i$ in Equation (5) corresponds to the link between pixels i and i+1. In this example, in order to guarantee that pixels with zero circle of confusion will not diffuse at all, computer system 100 use the minimum circle of confusion at the two pixels i and i+1 to generate $\beta_i$. Once the horizontal diffusion is complete, computer system 100 uses the result of the horizontal diffusion as the starting point for vertical diffusion. Operations of computer system 100 using GPU 185 are described further with respect to FIG. 4.

Figure 3A:
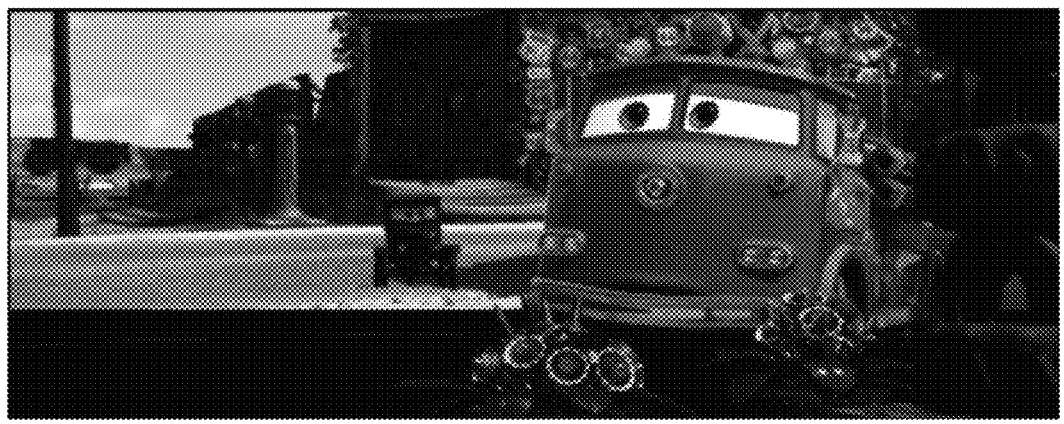
FIG. 3A depicts an image rendered using a pinhole camera.
Figure 3B:
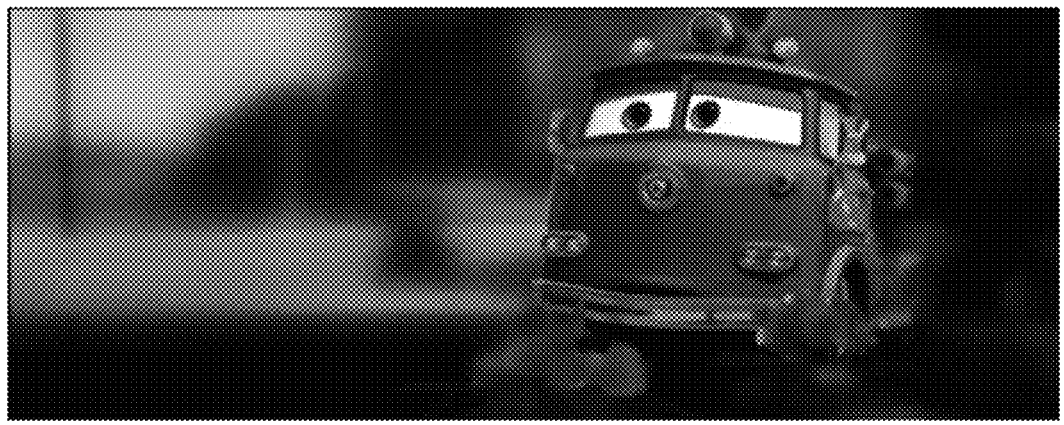
FIG. 3B depicts depth-of-field effects generated using simulated heat diffusion in one embodiment according to the present invention.

Thus, in embodiments, computer system 100 creates depth-of-field blurs by simulating the heat equation for a non-uniform medium. Computer system 100 provides depth-of-field effects that may be used for a high-quality preview. FIG. 3A depicts an image rendered using a pinhole camera on one embodiment according to the present invention. As shown in FIG. 3A, each pixel is rendered in focus. FIG. 3B depicts depth-of-field effects generated using simulated heat diffusion in one embodiment according to the present invention. As shown in FIG. 3B, computer system 100 generates depth-of-field effects for portions of the input image by simulating heat diffusion. Accordingly, computer system 100 provides image quality at frame rates that should be sufficient to allow a director of photography to specify, edit, and approve aperture settings and focus pulls interactively, offering a far greater level of artistic control than has previously been available. Furthermore, computer system 100 may also assist game developers desiring a good-quality interactive result for movie sequences and game play.

Interactive DOF Effects Using a GPU

In various embodiment, "cyclic reduction" allows depth-of-field effects to be generated using a GPU. In on embodiment, a system (e.g., computer system 100) for generating depth-of-field effects for computer graphics includes a display, (e.g., monitor 110), CPU (e.g., CPU 160), a GPU (GPU 185). The CPU is configured to receive information specifying a first image rendered using a pinhole camera. The CPU then determines a first set of circles of confusion for portions of the first image based on one or more parameters associated with the pinhole camera. The CPU converts or associates the first set of circles of confusion with heat conductivity of a medium. The GPU is configured to generate a second image including a first depth-of-field effect according to heat diffusion in the medium. The system then displays the second image on the display.

In various embodiments, computer system 100 provides interactive depth-of-field effects using GPU 185. In one example, computer system 100 uses a fast implementation of the above-described depth-of-field computation using vectorization of the tridiagonal system in Equation (10).

Figure 4:
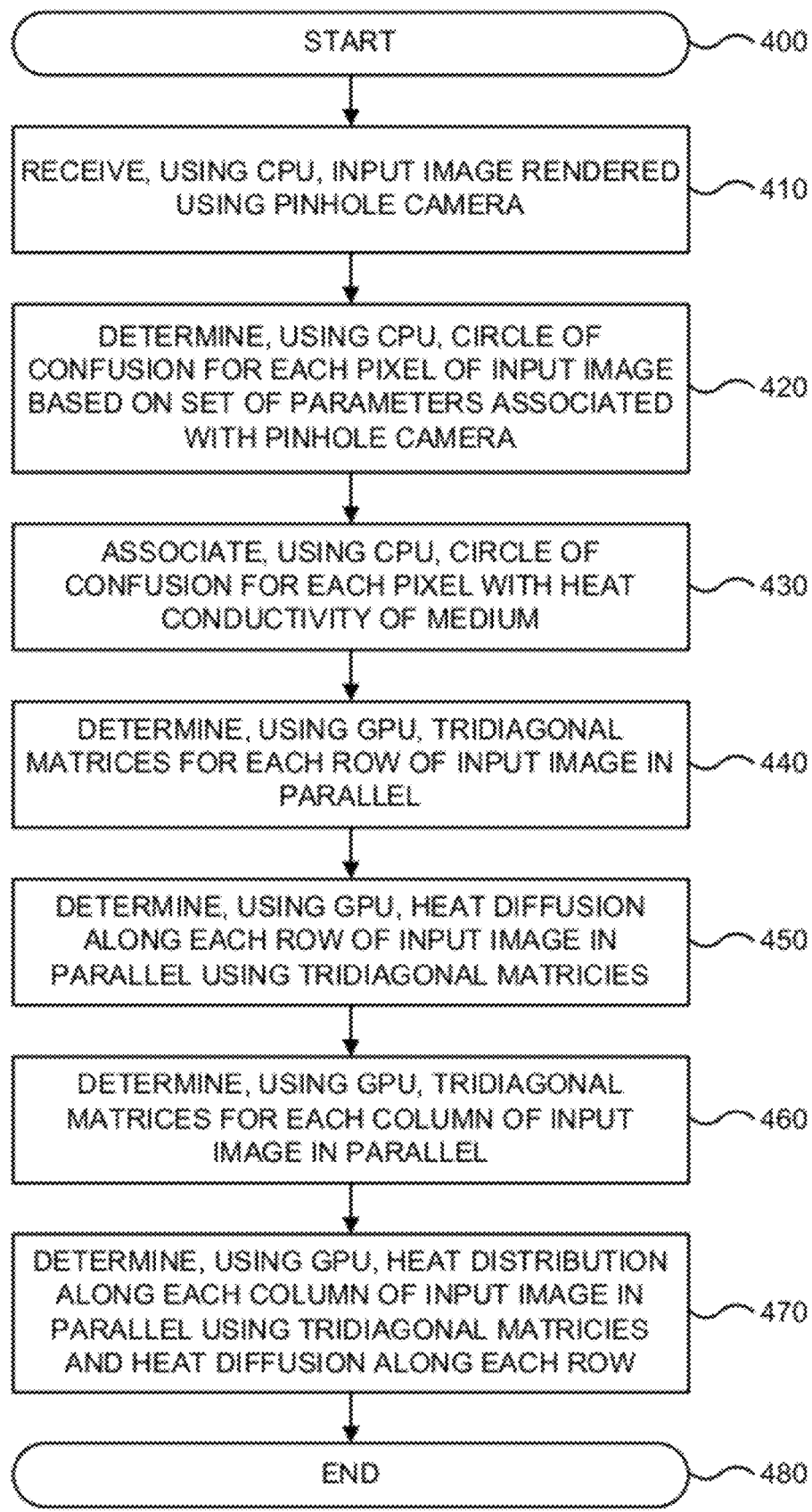
FIG. 4 is a flowchart for generating interactive depth-of-field effects using a GPU in one embodiment according to the present invention.

FIG. 4 is a flowchart for generating interactive depth-of-field effects using a GPU in one embodiment according to the present invention. FIG. 4 begins in step 400.

In step 410, computer system 100, using CPU 160, receives an input image (e.g., input image x(u,v)) rendered using a pinhole camera. In step 420, CPU 160 determines a circle of confusion for each pixel of the input image based on a set of parameters associated with the pinhole camera. In step 430, CPU 160 associates the circle of confusion for each pixel into thermal conductivity of a medium.

In step 440, computer system 100, using GPU 185, determines tridiagonal matrices for each row of the input image in parallel. In step 450, GPU 185 determines heat diffusion along each row of the input image in parallel using the tridiagonal matrices for each row of input image.

In step 460, computer system 100, using GPU 185, determines tridiagonal matrices for each column of input image in parallel. In step 470, GPU 185 determines heat distribution along each column of the input image in parallel using the tridiagonal matrices for each column of input image and the heat diffusion along each row. FIG. 4 ends in step 480.

In various embodiments, computer system 100 creates data structures to represent 2D arrays of input and output values (such as colors or depths, one per screen pixel) and a tridiagonal matrix. In general, representing a 2D array is straightforward: 2D arrays are stored as 2D textures, with individual entries (colors or depths) stored as texels (RGB for colors, floating-point scalars for depths). The structure of the tridiagonal matrix lends itself to storage typically as a 1D array.

In this example, each row of a tridiagonal matrix contains 3 elements ($a_n$, $b_n$, and $c_n$). Computer system 100 stores the elements (e.g., using RAM 170) in a single texel as R, G, and B values. Computer system 100 can represent a 1D array of tridiagonal matrices in a single 2D texture, with entries in the tridiagonal matrix in the same texel positions as their corresponding entries in the 2D arrays of inputs or outputs.

In various embodiments, computer system 100 uses a tridiagonal system as a particular type of a recurrence equation and as such, can be efficiently solved in parallel using the scan primitive. In computer graphics, the scan primitive has been used to implement an O(n log n) stream compaction primitive. The logarithmic forward-propagation-back-propagation structure, referred to herein as "cyclic reduction," is also a type of scan. Accordingly, computer system 100 uses an implementation that runs in O(n) time.

LU decomposition is the traditional method for solving a tridiagonal system. Unfortunately, each step in the forward and back substitutions of an LU decomposition relies on the previous step, and hence cannot be parallelized by computer system 100 to take advantage of GPU 185. Instead, computer system 100 uses a method of "cyclic reduction."

In general, cyclic reduction works by recursively using Gaussian elimination on all the odd-numbered unknowns in parallel. During elimination, computer system 100 expresses each of the odd-numbered unknowns in terms of its neighboring even-numbered unknowns, resulting in a partial solution and a new system, each with half the number of equations. Computer system 100 repeats the process for log m steps, until only one equation remains along with a hierarchy of partial solutions to the system. Next, computer system 100 uses the solution to this equation, which is fed back into the partial solutions, and after log m steps to propagate the known results into the partial solutions, computer system 100 generates the final result to the.

While cyclic reduction may require more arithmetic than an LU solver, computer system 100 uses only a constant time per unknown, which is amenable for use on GPU 185. Accordingly, computer system 100 associates, in each row, each pixel with one input element as well as to one row of the tridiagonal matrix. In the forward propagation step, a pass that begins with m unknowns will produce a new system with m/2 unknowns. This is because each new system produces two output matrices of half the size. Computer system 100 then allocates a pyramid of textures at the outset, requiring an aggregate additional amount of storage equal to twice the size of the original tridiagonal matrix texture.

In various embodiments, computer system 100 refactors the traditional description of cyclic reduction so that the computation of an output element k requires data from input elements 2k−1, 2k, and 2k+1.

As discussed previously, computer system 100 determines results first, for all rows, and then use the results to solve all columns in parallel. Computer system 100 exploits the parallelism of GPU 185, by constructing tridiagonal matrices for each row in parallel, solving the systems of matrices on each row in parallel, then repeating the previous two steps on the columns of an input image x(u,v).

In various embodiments, computer system 100 computes the tridiagonal matrix on GPU 185 with a single GPU pass, computing all matrix rows in parallel. In one example, the results generated by computer system 100 for each row typically need the thermal conductivity and input coupling coefficient from itself and its immediate neighbors. Computer system 100 generates, for an m×n image, nm×m tridiagonal matrices, each corresponding to a row of input image x(u,v), stored as rows in a single m×n texture. Computer system 100 then solves each of these n systems in parallel to produce n solutions to the 1D heat diffusion equation, each solution corresponding to a row of input image x(u,v).

Thus, in embodiments, computer system 100 enables GPU 185 to run or execute the same program on every pixel, enabling high performance. Furthermore, computer system 100 also allows GPU 185 to leverage its ability to read random memory locations (gather) without requiring writes to random memory locations (scatter).

In various embodiments, using GPU 185, computer system 100 has image-space complexity so its runtime is a generally a function of the input image size. In one example, using background and midground layers, as discussed further below, on a 256×256 image, computer system 100 likely sustains 80-90 frames per second. In another example, on a 512×512 image, computer system 100 likely sustains 21-23 frames per second. In another example, on a 1024×1024 image, computer system 100 likely sustains 6-7 frames per second.

In various embodiments, the performance of computer system 100 scales approximately linearly with the number of pixels of the input image. Thus, computer system 10 provides performance suitable for use in high-quality film preview applications, such as Pixar's Renderman product from Pixar Animation Studios, Emeryville Calif. Additionally, computer system 100, in combination with next-generation GPUs provides will provide depth-of-field effects for use in real-time entertainment applications, such as games.

Ranges of Depths in Depth-of-Field Effects

In further embodiments, computer system 100 distinguishes different ranges of depth. In one example, computer system 100 determines three ranges of depth. In this example, the furthest depth range, referred to as background or the background layer, consists of portions of an input image that lie far enough behind the plane of focus to have large circles of confusion. Continuing the example, the next closer depth range, referred to as midground or the midground layer, consists of portions of the image with depths near enough to the plane of focus on either side to have relatively small circles of confusion. Finally, in the example, the closest depth range, referred to as foreground or the foreground layer, consists of portions of the image enough closer than the focal plane to have large circles of confusion.

Blurring Underneath

In general, depth-of-field effect generated by computer system 100 using the heat diffusion algorithm described above, successfully maintains the sharpness of in-focus objects and prevents color bleeding from taking place between in-focus objects and neighboring out-of-focus objects.

In some real optical situations, it is not uncommon for background objects to have circles of confusion so large that they blur behind sharp foreground objects. Since computer system 100 treats in-focus objects in the diffusion approach as heat insulators, blurring due to the heat equation can be blocked by in-focus midground objects, and severe artifacts can result. In various embodiment, in order to address the problem of blurring underneath in-focus objects, computer system 100 provides a separate layer to process background portions of an input image with large circles of confusion to be blended with the output image generated as discussed previously (e.g., using single-layer diffusion).

Figure 5:
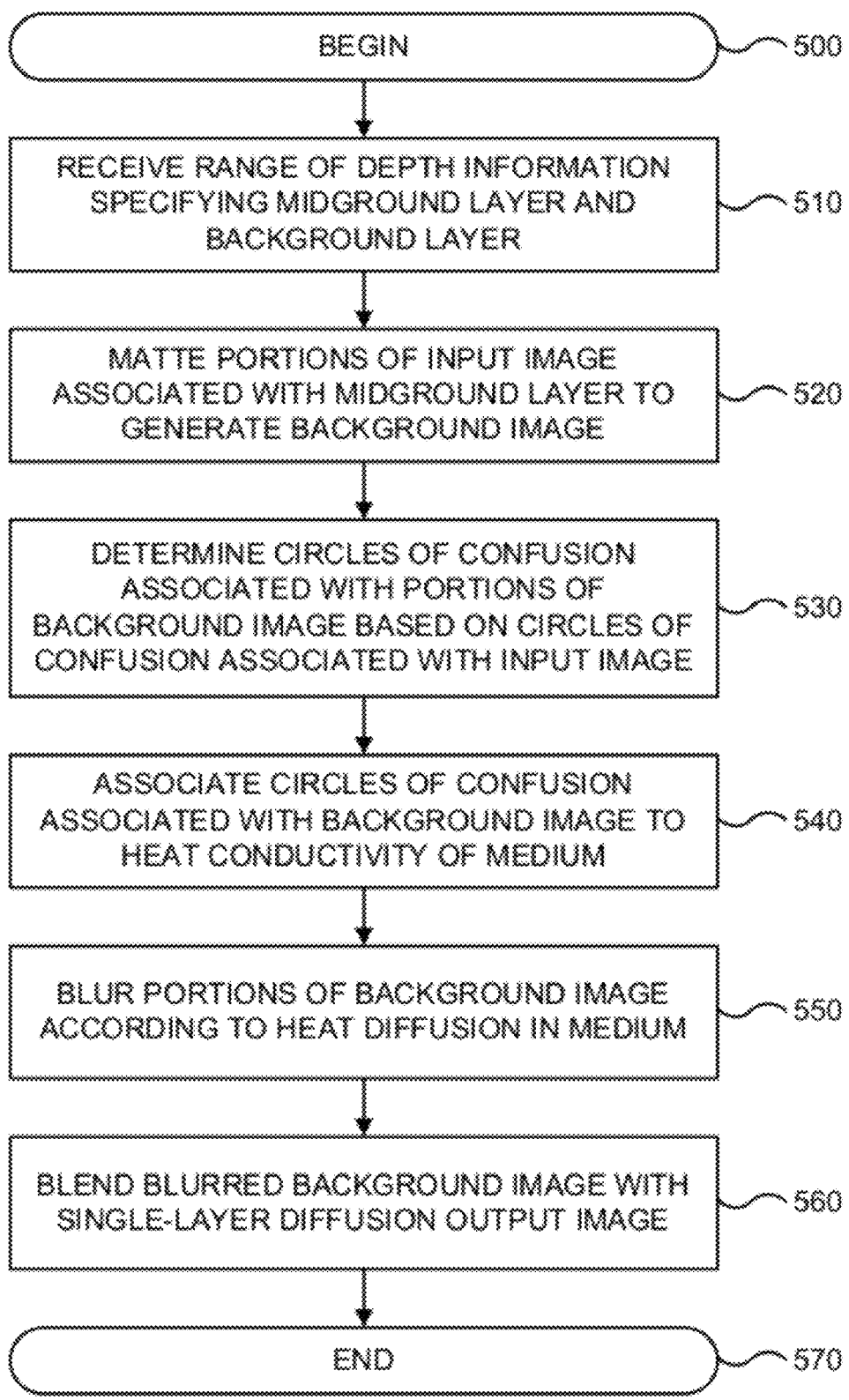
FIG. 5 is a flowchart for generating a depth-of-field effect for an object underneath an in-focus object.

FIG. 5 is a flowchart for generating a depth-of-field effect for an object underneath an in-focus object. FIG. 5 begins in step 500.

In step 510, computer system 100 receives information specifying a plurality of ranges of depth. In this example computer system 100 receives range of depth information specifying a midground layer and a background layer for an input image.

In step 520, computer system 100 mattes out portions of input image associated with the midground layer (i.e., in-focus objects in the depth-of-field) to generate a background image. In step 530, computer system 100 determines a set of circles of confusion associated with portions of the background image based on the set of circles of confusion associated with the input image. For example, the set of circles of diffusion determines during single-layer diffusion discussed above. In step 540, computer system 100 associates the circles of confusion associated with the background image with heat conductivity of the medium.

In step 550, computer system 100 blurs the portions of the background image according to heat diffusion in the medium. In step 560, computer system 100 blends the blurred background image with a single-layer diffusion output image. In this example, the single-layer diffusion output image represents the single layer diffusion of the input image previously discussed (e.g., FIG. 2.) FIG. 5 ends in step 540.

In various embodiments, computer system 100 uses the specific heat $\gamma$ for computing the background layer. In effect $\gamma$ acts as a coupling coefficient between the initial conditions and the diffusion. Where $\gamma$ is large, the initial conditions will greatly influence the final result. Where $\gamma$ is zero, the initial conditions become entirely irrelevant.

Continuing the previous example, let $\alpha(u,v)$ be a matte that separates background regions from midground regions in the input image $x(u,v)$. In this example, $\alpha$ will be zero for pixels with small circles of confusion, and ramp up smoothly to one for pixels with circles of confusion equal to or greater than a level that identifies them as background pixels. By setting $\gamma=\alpha$, computer system 100 causes the diffusion take into account the matte, and interpolate the proper information in the gaps.

Where $\alpha$ is small, generally two kinds of information missing in the gaps: background colors and the corresponding circles of confusion. Before computer system 100 interpolates the colors appropriately, computer system 100 estimates those circles of confusion. To interpolate the circles of confusion, computer system 100 uses the original circles of confusion, instead of colors as the input to the diffusion computation.

Accordingly, setting $\gamma=\alpha$ provides that circles of confusion from fully in-focus midground regions will be completely ignored. Generally, for this diffusion, computer system 100 sets $\beta$ to be a constant such that the filter size is comparable to the blur-size threshold between midground and background.

Once computer system 100 interpolates the circles of confusion, computer system 100 proceeds to blur the background layer using heat diffusion on the color information with $\gamma=\alpha$, and the colors will fill in the gaps.

Figure 6A:
FIG. 6A depicts an image rendered using a pinhole camera.
Figure 6B:
FIG. 6B depicts single-layer diffusion of the image of FIG. 6A in one embodiment according to the present invention.

FIG. 6A depicts an input image rendered using a pinhole camera in one embodiment according to the present invention. FIG. 6B depicts single-layer diffusion of the image of FIG. 6A in one embodiment according to the present invention. As shown in FIG. 6B, thin leaves of a tree block the blurring of the yellowish background plane in such a way that the originally straight outline of the plane becomes unacceptably distorted.

Figure 6C:
FIG. 6C depicts a background layer on the image of FIG. 6A in one embodiment according to the present invention.
Figure 6D:
FIG. 6D depicts an image resulting from the blending of the single-layer diffusion image of FIG. 6B and the background layer image of FIG. 6C.

FIG. 6C depicts a background layer on the image of FIG. 6A in one embodiment according to the present invention. As shown in FIG. 6C, the closest of the leaves have been removed by the $\alpha$ channel, and diffusion has filled in the background with a smooth interpolation. FIG. 6D depicts an image resulting from the blending of the single-layer diffusion image of FIG. 6B and the background layer image of FIG. 6C. As shown in FIG. 6D, the original midground layer is matted over the background layer. The objectionable artifacts of the midground layer are significantly reduced, as the background layer provides blurring behind the long thin in-focus midround layer leaves.

Figure 6E:
FIGS. 6E and 6F depict the sizes of circles of confusion at each pixel in one embodiment according to the present invention.
Figure 6F:
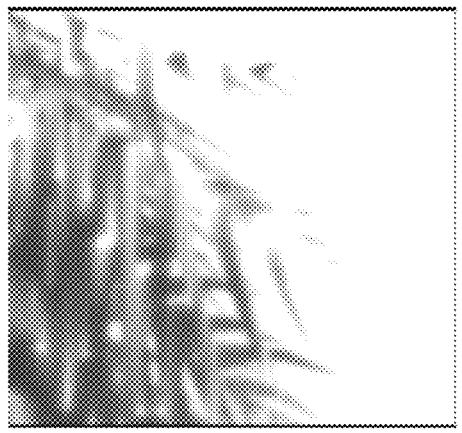

FIGS. 6E and 6F depict the sizes of circles of confusion at each pixel in one embodiment according to the present invention. FIG. 6E shows the original circles of confusion before matting. FIG. 6E corresponds to FIG. 6B. FIG. 6F shows the results after matting and smoothing. FIG. 6F corresponds to FIG. 6C.

In various embodiments, computer system 100 provides different choices for the threshold blur size that separates the midground layer from the background layer. In general, for the highest possible quality, computer system 100 can perform this background computation at a number of different thresholds chosen on a log scale, and then matte among all the different layers based on the circle of confusion of each pixel.

Blurring on Top

In general, depth-of-field effect generated by computer system 100 using the heat diffusion algorithm described above, successfully maintains the sharpness of in-focus objects and prevents color bleeding from taking place between in-focus objects and neighboring out-of-focus objects.

Typically, when a foreground object gets very blurry, it begins to become transparent because a wide enough aperture allows a camera to collect rays that go fully around the object. If the aperture is sufficiently wide, the transparency can be almost complete. The problem when a foreground object becomes transparent is what to show behind it. In some post-processing methods, no information is provided about the image or scene behind the very blurry foreground object, and a later high-quality result cannot be produced. For example, if the blurry foreground object obscures a sharp midground object, there is generally no way to create the high-frequency detail on the obscured object.

In various embodiments, computer system 100 supplements a source or input image separated into different layers with a foreground image containing information about objects in the foreground layer of the input image.

Figure 7:
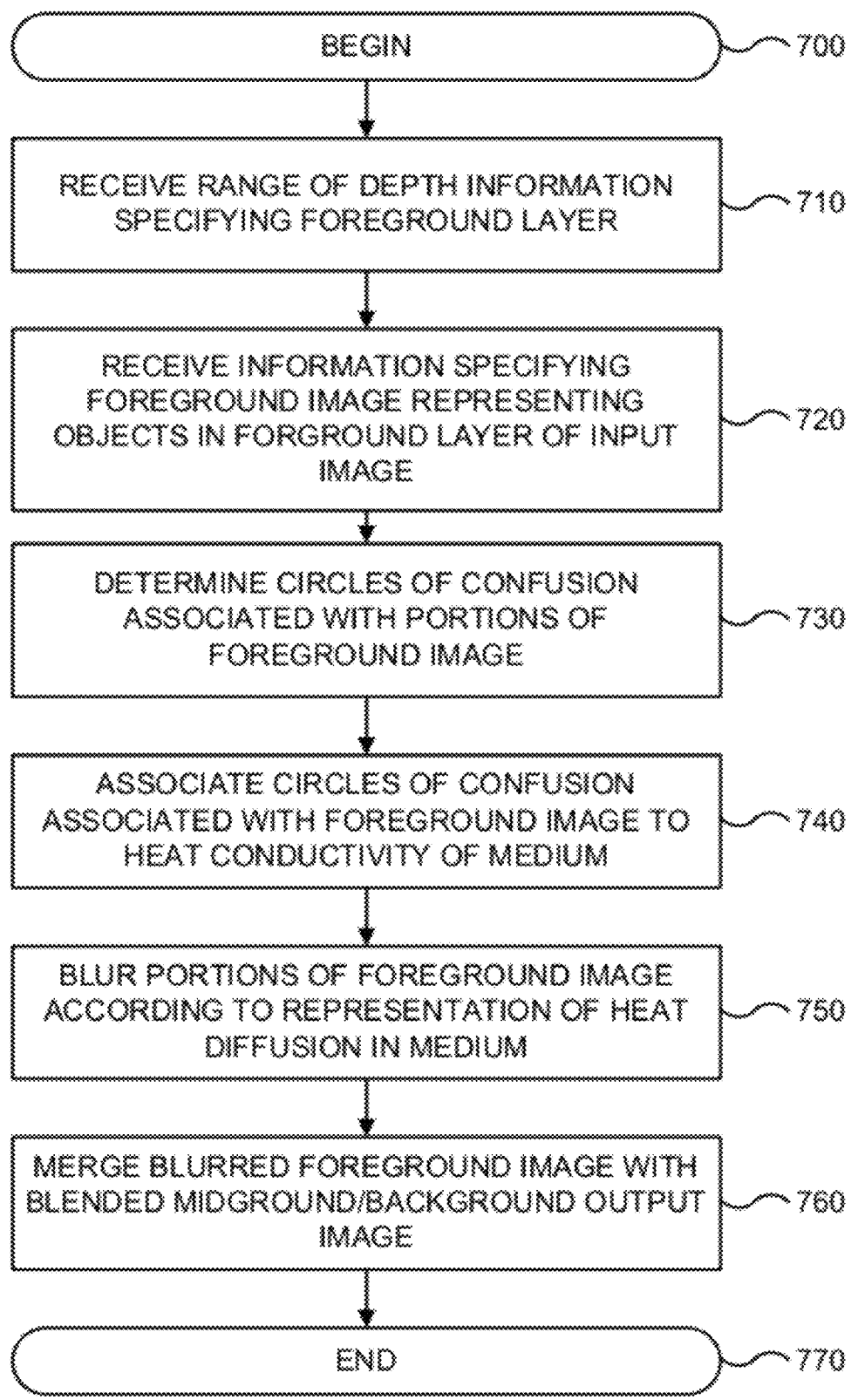
FIG. 7 is a flowchart for generating a depth-of-field effect for an object on top of an in-focus object in one embodiment according to the present invention.

FIG. 7 is a flowchart for generating a depth-of-field effect for an object on top of an in-focus object in one embodiment according to the present invention. FIG. 7 starts in step 700.

In step 710, computer system 100 receives information specifying a foreground layer. In step 720, computer system 100 receives a foreground image (e.g., an RBGZα foreground image) representing an object in foreground layer of the input image. In step 730, computer system 100 determines a set of circles of confusion associated with portions of the foreground image. In step 740, computer system 100 associates the set of circles of confusion associated with the portions of the foreground image with heat conductivity in the medium.

In step 750, computer system 100 blurs the portions of the foreground image according to heat diffusion in the medium. In step 760, computer system 100 merges the blurred foreground image with a blended midground/background output image. In this example, computer system 100 merges or composites the blurred foreground image with the output image generated using the blending of midground and background layers as previously discussed (e.g., FIG. 5). FIG. 7 ends in step 770.

In general, computer system 100 diffuses the circles of confusion of the foreground image based on the alpha channel. In this example, the weights γ are given by the α channel of the foreground object input. Having calculated these new circles of confusion, computer system 100 diffuses not only the input colors, but also the input α, with γ again given by the foreground object α channel.

Figure 8A:
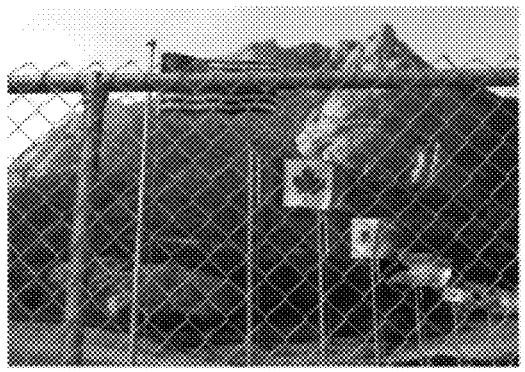
FIGS. 8A, 8B, 8C, and 8D depict images rendered using simulated heat diffusion in one embodiment according to the present invention.
Figure 8B:
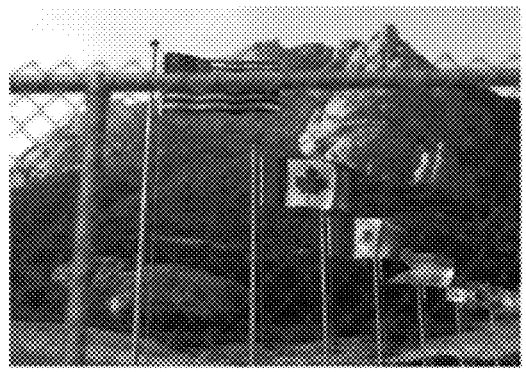
Figure 8C:
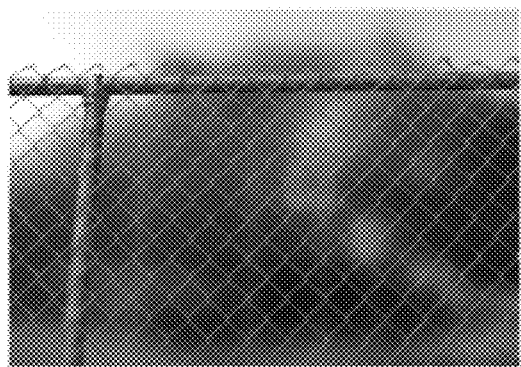
Figure 8D:

FIGS. 8A-8D depict images rendered using simulated heat diffusion in one embodiment according to the present invention. FIG. 8A shows a fence covering a flag. Generally, no post-processing algorithm can be expected to invent the additional stripes in the flag that are obscured in the pinhole camera view, yet are needed to produce a proper depth-of-field effect in the image. FIG. 8B depicts blurring for depth-of-field effects by computer system 100 with a narrow camera aperture and a mid-distance focal plane. FIG. 8C depicts blurring for depth-of-field effects by computer system 100 with a wide aperture and a near focal plane. FIG. 8D depicts blurring for depth-of-field effects by computer system 100 with a wide aperture and a distant focal plane. Even though we are looking through a fence, the camera aperture is wide enough that the foreground fence has become almost completely invisible.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for managing operations performed by computer graphics applications, the method comprising:
    receiving, at one or more computer systems, a set of coefficients associated with a banded set of linear equations;
    determining, with one or more processors associated with the one or more computer systems, a reduced set for the banded set of linear equations using at least one cyclic reduction performed on the one or more processors when configured with an algorithm for cyclic reduction implemented according to a graphics-specific programming language; and
    storing information indicative of a solution to the banded set of linear equations determined from the reduced set in a storage device associated with the one or more computer systems.

2. The method of claim 1 further comprising configuring the one or more processors based on the algorithm for cyclic reduction implemented according to the graphics-specific programming language.

3. The method of claim 1 wherein determining, with the one or more processors associated with the one or more computer systems, the reduced set for the banded set of linear equations using at least one cyclic reduction performed on the one or more processors when configured with an algorithm for cyclic reduction implemented according to a graphics-specific programming language comprises determining another reduced set for the banded set of linear equations using another at least one cyclic reduction on the one or more processors.

4. The method of claim 1 further comprising determining the solution to the banded set of linear equations based on the reduced set.

5. The method of claim 4 wherein determining the solution to the banded set of linear equations based on the reduced set comprises directly solving the reduced set.

6. The method of claim 1 further comprising receiving program code according to the graphics-specific language specifying the algorithm for cyclic reduction.

7. The method of claim 1 wherein the graphics-specific language comprises at least one of Open Computing Language (OpenCL), Open Graphics Library (OpenGL), Compute Unified Device Architecture (CUDA), or DirectX.

8. The method of claim 1 wherein the graphics-specific language implements a framework for writing programs that execute across heterogeneous platforms having at least general purpose processor and at least one specific-purpose processor having a parallel structure.

9. A non-transitory computer-readable medium storing computer-executable code for managing operations performed by computer graphics applications, the non-transitory computer-readable medium comprising:
    code for determining, with the one or more processors associated with one or more computer systems, a reduced set for the banded set of linear equations using at least one cyclic reduction on the one or more dedicated graphics processing units programmed using a graphics-specific language; and code for generating a solution to the banded set of linear equations based on the reduced set.

10. The non-transitory computer-readable medium of claim 9 further comprising code for configuring the one or more processors based on the algorithm for cyclic reduction implemented according to the graphics-specific programming language.

11. The non-transitory computer-readable medium of claim 9 wherein the code for determining the reduced set for the banded set of linear equations using at least one cyclic reduction performed on the one or more processors when configured with an algorithm for cyclic reduction implemented according to a graphics-specific programming language comprises code for determining another reduced set for the banded set of linear equations using another at least one cyclic reduction on the one or more processors.

12. The non-transitory computer-readable medium of claim 9 wherein the code for generating the solution to the banded set of linear equations based on the reduced set comprises code for directly solving the reduced set.

13. The non-transitory computer-readable medium of claim 9 wherein the graphics-specific language comprises at least one of Open Computing Language (OpenCL), Open Graphics Library (OpenGL), Compute Unified Device Architecture (CUDA), or DirectX.

14. The non-transitory computer-readable medium of claim 9 wherein the graphics-specific language implements a framework for writing programs that execute across heterogeneous platforms having at least general purpose processor and at least one specific-purpose processor having a parallel structure.

15. A method for managing operations performed by computer graphics applications, the method comprising:
    receiving, at one or more computer systems, a set of coefficients associated with a recursive filter;
    receiving, at the one or more computer systems, a data set to be filtered;
    filtering, with one or more processors associated with the one or more computer systems, the data set filtered by a recursive filter using cyclic reduction performed on the one or more processors when configured with an algorithm for cyclic reduction implemented according to a graphics-specific programming language; and
    storing information indicative of the filtered data set in a storage device associated with the one or more computer systems.

16. The method of claim 15 wherein filtering, with the one or more processors associated with the one or more computer systems, the data set filtered by the recursive filter using cyclic reduction performed on the one or more processors when configured with the algorithm for cyclic reduction implemented according to the graphics-specific programming language comprises filtering a reduced set for a banded set of linear equations.

17. The method of claim 15 further comprising determining a direct solution to a banded set of linear equations based on the filtered data set.

18. The method of claim 15 further comprising receiving, at the one or more computer systems, program code according to the graphics-specific language specifying the at least one cyclic reduction.

19. The method of claim 15 wherein the graphics-specific language comprises at least one of Open Computing Language (OpenCL), Open Graphics Library (OpenGL), Compute Unified Device Architecture (CUDA), or DirectX.

20. A non-transitory computer-readable medium storing computer-executable code for managing operations performed by computer graphics applications, the non-transitory computer-readable medium comprising:
    code for receiving a set of coefficients associated with a recursive filter;
    code for receiving a data set to be filtered; and
    code for filtering the data set filtered by a recursive filter using cyclic reduction performed on one or more processors when configured with an algorithm for cyclic reduction implemented according to a graphics-specific programming language.

21. The non-transitory computer-readable medium of claim 20 wherein the code for filtering the data set filtered by the recursive filter using cyclic reduction performed on the one or more processors when configured with the algorithm for cyclic reduction implemented according to the graphics-specific programming language comprises code for filtering a reduced set for a banded set of linear equations.

22. The non-transitory computer-readable medium of claim 20 further comprising code for determining a direct solution to a banded set of linear equations based on the filtered data set.

23. The non-transitory computer-readable medium of claim 20 wherein the graphics-specific language comprises at least one of Open Computing Language (OpenCL), Open Graphics Library (OpenGL), Compute Unified Device Architecture (CUDA), or DirectX.

* * * * *